United States Patent Office 3,257,351
Patented June 21, 1966

3,257,351
DISPERSION OF PIGMENTS IN ETHYLENE POLYMERS
Gerard Kraus and Archie L. Robbins, Bartlesville, Okla., assignors to Phillips Petroleum Company, a corporation of Delaware
No Drawing. Filed Oct. 31, 1960, Ser. No. 65,957
7 Claims. (Cl. 260—41)

This invention relates to the dispersion of pigments in polyolefins. In accordance with one aspect, this invention relates to an improved process for dispersing carbon black of a small particle size and other finely divided, difficultly dispersible pigments in polyolefins, especially polymers of ethylene. In accordance with another aspect, this invention relates to uniformly pigmented polyolefin compositions, particularly polymers of ethylene. In accordance with still another aspect, this invention relates to an improved process for preparing polyolefin-carbon black masterbatches.

The incorporation of carbon black in solid polymers of 1-olefins, such as polyethylene and polypropylene, has long been known and various procedures have been proposed for the production of olefin polymer-carbon black compositions. In many of these operations large amounts of black, generally greater than 25 percent and frequently as high as 50 percent based on the polymer, have been added as a filler, contributing increased hardness, stiffness, and heat distortion values.

For numerous applications of olefin polymers, black stocks containing 5 percent or less of carbon black are used. Loading at these levels provides effective protection against degradation from exposure to actinic light, prevents oxidation, and imparts color to the polymer. In the production of these compositions, numerous problems have been encountered in obtaining uniform dispersion of the black in the polymer, there being a tendency for the formation of agglomerates or clumps of undispersed pigment which are difficult or impossible to break up. Such agglomerates form points of weakness leading to failure of fabricated articles in which they occur.

One method which has been employed for incorporating low levels of black in olefin polymers is that of preparing a masterbatch of fairly high black content, say 20 or 30 percent based on the polymer, by Banbury blending or a similar mixing technique and blending this with further amounts of polymer until the desired black level is obtained. While this technique is an improvement over direct blending of black with polymer at the desired level, the results are frequently far from satisfactory. However, it has been found that agglomerates are formed in masterbatches when blending by methods heretobefore employed and that these agglomerates carry over in any further blending which may be done.

The present invention relates to an improved process for uniformly dispersing pigments, such as carbon black, in polyolefins, particularly polymers of ethylene, and to the compositions so produced.

Accordingly, an object of this invention is to provide a process for the production of uniformly pigmented polyolefins.

Another object of this invention is to provide an improved process for preparing polyolefin-carbon black masterbatches from solutions of polyolefins.

Another object of this invention is to provide a pigmented polymer of ethylene in which the pigment particles are very finely divided and uniformly dispersed therein and in which there are no large pigment agglomerates.

Another object of this invention is to provide a practical and economical method for preparing polyethylene-carbon black masterbatches wherein the carbon black is uniformly dispersed therein.

Other objects, aspects as well as the several advantages will become apparent to those skilled in the art from a study of the disclosure and the appended claims.

In accordance with the present invention, we have now discovered that finely divided, difficultly dispersible pigments, such as carbon black, can be uniformly incorporated into polyolefins or polymers of 1-olefins, especially polymers of ethylene, by precipitation comprising adding a hot homogenized mixture of a pigment and a liquid non-solvent for said polymer to a solution of said polymer to cause precipitation of a pigment-containing masterbatch and then recovering said masterbatch.

More specifically, finely divided pigments, such as carbon blacks, are uniformly dispersed in polyolefin materials by a process which comprises the steps of dispersing a pigment in a non-solvent for the polyolefin by use of a suitable homogenizing means, heating the pigment dispersion thus prepared to a temperature above about 75° C., and then intimately mixing the hot dispersion of pigment in the non-solvent with a hot solution of the polyolefin, thereby precipitating a pigment-containing masterbatch and recovering the masterbatch thus produced as a product of the process.

We have found that pigment dispersions in polyolefin non-solvents such as alcohols and ethers act to precipitate the polyolefin from solution as a homogeneous pigment-containing masterbatch. The masterbatch thus obtained can be used per se or it can be mixed with further amounts of polyolefin to provide homogeneous compositions of any desired pigment content. In general, it is preferred to form a final polymeric product containing from about 0.1 to about 5 weight percent finely divided pigment dispersed therein, although higher pigment contents can be prepared when desired.

The preferred non-solvents for preparation of the pigment dispersions are alcohols and ethers, preferably those boiling above about 75° C. Representative alcohol compounds which are applicable include the monohydroxy alcohols such as isopropyl, butyl, amyl, hexyl, heptyl, decyl, dodecyl, cyclopentyl, cyclohexyl, cycloheptyl, and the like. Examples of other alcoholic materials that can be used include the glycols and polyhydric alcohols, including ethylene glycol, propylene glycol, glycerol, and the like. Suitable ether materials that can be used include glycol monomethyl ether (methyl Cellosolve), glycol monoethyl ether (Cellosolve), glycol monobutyl ether (butyl Cellosolve), dioxane, dibutyl ether, propyl butyl ether, propyl ether, and the like. It is presently preferred to employ alcohols and ethers that have a boiling point between about 75 and about 200° C. although materials having a boiling point outside this range can be used when desired.

The pigments employed in the present invention can be any well known pigments ordinarily blended with polymers. However, carbon blacks is preferred. The carbon black employed can be any of the type including both channel and furnace black, lamp black, and the like. Where reference is made to carbon black or carbon particles, this term should be understood to include all forms of carbon which have been found effective for light shielding in polymeric materials. The particle size of the carbon black preferably does not exceed about 1,000 Angstroms. Although the invention is discussed mainly in terms of carbon black, the teachings of the invention obviously can be practiced with advantage to the incorporation of other prime reinforcing and extender pigments. Other pigments which are obtained as insoluble particulate solids such as zinc oxide, titanium dioxide, lithopone, clays, hydrated alumina, precipitated calcium carbonates, and the like, can be used instead of carbon black when desired.

The pigment dispersion or slurry prepared in the first step of the process of the present invention is obtained by mixing the pigment, such as carbon black, with a polyolefin non-solvent, such as described above, in an apparatus which provides a grinding action, for example a 3-roll paint mill, a pigment mill, an ink mill, a ball mill, or a homogenizer or other similar device to provide a uniform dispersion of the pigment in the non-solvent material.

The amount of pigment, such as carbon black, dispersed in the non-solvent material generally will be in the range from about 1 to about 10 weight percent although amounts outside this range can be employed when desired. The grinding step for uniformly dispersing the pigment in the non-solvent material will ordinarily be conducted at room temperature, although in some instances higher temperatures can be used.

As noted above, the relative amounts of alcohol or ether and carbon black in the slurry are adjusted so that when the masterbatch is prepared it will contain the desired amount of carbon black and the alcohol or ether present will be sufficient to effect substantially complete precipitation of the polyolefin from solution. The amount of alcohol or ether and carbon black can readily be determined by simple tests with the particular polyolefin solutions. However, in general, slurries are prepared containing 1 to 10 percent carbon black based on the weight of the slurry or dispersion.

In the actual preparation of the carbon black dispersion in the non-solvent for the polyolefin, it is sometimes desirable to employ a minor amount of an alkali metal hydroxide in the dispersion. The quantity of alkali metal hydroxide employed will depend upon the type of carbon black used, but, in general, not more than 5 weight percent alkali metal hydroxide, based on the black, is employed.

Prior to incorporating or commingling the alcoholic or ether pigment dispersion with the polyolefin solution, the pigment dispersion is heated to a temperature above about 75° C., preferably in the range from about 75 to 150° C. . In a preferred embodiment of the invention, the temperature of the alcoholic or ether pigment dispersion can be about the same as that of the polymer solution with which it is mixed.

The next step of the process comprises intimately mixing the alcoholic or ether slurry or dispersion of carbon black described above with the polymer dissolved in a suitable solvent.

In accordance with the present invention, the polyolefin is dissolved in a suitable hydrocarbon solvent which can be paraffinic, cycloparaffinic, or aromatic by heating. In general, aromatic hydrocarbon solvents are preferred because of their higher solvent power for the polymer. The amount of polymer added to the solvent will generally not exceed about 5 weight percent and will preferably be from about 1.5 to 3 percent since these solutions are less viscous.

Representative hydrocarbon solvents that can be used include toluene, benzene, the xylenes, and the like, or mixtures of these, cycloparaffins, such as cyclohexane and methyl cyclohexane, paraffinic hydrocarbons such as normal pentane, normal hexane, isooctane, and the like, or mixtures of any of these.

As indicated above, an important feature of the present invention is the commingling of the hot homogenized mixture of carbon black and at least one of the non-solvents described above with a hot solution of the polyolefin. The non-solvent slurry acts to precipitate a polyolefin as a homogenous pigment-containing masterbatch. In actual operation, the polyolefin can be dissolved in a suitable solvent described above by heating to a temperature above the gel point or solution temperature of the particular polymer being dissolved. Generally, the temperature of the polymer solution will be of the order of about 100° C., or higher. Alternatively, at least a portion of the reaction effluent from a solution polymerization zone, for example, can be commingled with the alcoholic or ether slurry of the invention to cause precipitation of the polyolefin from solution and form a homogenous pigment-containing masterbatch. The masterbatch prepared by any of the above procedues can advantageously contain up to about 40 percent pigment. This masterbatch then can be "let down" by mixing or blending with additional amounts of polyolefin to the desired level of pigment on a roll mill, a Banbury mixer, or any other suitable blending means. This blending is preferably carried out at a temperature above the softening temperature of the polyolefin. The amount of pigment in the final polymer composition generally ranges from about 0.1 to about 5 weight percent; however, higher loading of pigments in the polymer can be readily accomplished by the invention when desired.

In the practice of the invention, it is necessary that the concentrations of pigment in the dispersion and of polymer in the solution be adjusted to provide the desired proportion of black to polymer in the masterbatch and at the same time provide an amount of non-solvent from the dispersion to effect precipitation of the polymer. It is also preferable that the non-solvent used for the dispersing liquid and the solvent for the polymer be selected in a manner such that separation of these liquids can be readily effected in subsequent recovery operations.

The olefin polymers used in the present invention include homopolymers and copolymers of 1-olefins such as ethylene, propylene, 1-butene, and the like. The preferred polyolefins include ethylene homopolymers and copolymers of ethylene with at least one olefin having a higher molecular weight, especially aliphatic olefins having from 3 to 12 carbon atoms per molecule, for example propylene, 1-butene, 2-butene, isobutylene, 1-pentene, 1-hexene, 4-methyl-1-pentene, 1-octene, 1-dodecene, and the like.

The polyolefins or 1-olefin polymers that can be pigmented by the practice of the present invention can be prepared by any of the well known methods which are usually employed in the preparation of these polymers. One well known method for preparing polymers of 1-olefins is the chromium oxide-catalyzed polymerization described in the Hogan et al. patent, U.S. 2,825,721 (1958). The polyolefins prepared by Hogan et al. are characterized by their high density. Polymers of ethylene, including homopolymers and copolymers, prepared by this method generally have a density ranging from 0.920 to 0.990, ordinarily 0.930 to 0.970.

In addition to the foregoing method of preparing the 1-olefin polymers, especially polymers of ethylene, the invention also includes within its scope the pigmentation of polyolefins prepared by polymerization in the presence of an organometal catalyst such as trialkyl aluminum in conjunction with a titanium halide, or in polyolefins prepared by the high pressure polymerization processes which employ oxygen, peroxide, or other oxygen carrier as a catalyst.

The pigmented compositions of this invention can have widely different uses. For example, compositions containing a carbon black have been found to have greatly improved resistance to ultraviolet light and the effects of outdoor weathering when compared with unpigmented polyolefins or polyolefin compositions containing carbon black poorly dispersed therein. Also, points of weakness in molded items caused by agglomeration of pigment are eliminated. Polyolefin compositions containing the finely divided pigments other than carbon black are useful in the fabrication of molded or extruded articles where attractive coloration is desired and can be fabricated by conventional methods into sheets, rods, tubes, films, and the like.

The following examples are given to better illustrate the invention.

EVALUATION PROCEDURE

For evaluation of the dispersions of carbon black in an olefin polymer, a small specimen approximately 5.0 x 5.0 x 0.5 mm. was cut from the polymer with a razor blade and positioned near the middle of a standard glass microscope slide. A second slide was placed over the specimen after which the assembly was placed on a hot plate under an 800-gram weight. The slide assembly was heated until the polymer was melted and pressed out between the slides to provide a layer approximately 0.5 mil in thickness. This slide was then examined under 50× magnification by transmitted light. Rating was made according to Bell Laboratories standards as follows:

A=fine homogeneous dispersion with no significant agglomerates.
B=good but a few very small agglomerates.
C=fair, several small agglomerates.
D=unacceptable, large agglomerates.

Example I

Five grams of carbon black was added to 1,000 ml. of isopropyl alcohol. The carbon black was Monarch 74, a fine pigment type channel black. This mixture was homogenized in an Eppenbach colloid mill to provide a uniform dispersion. 300 ml. of the carbon black dispersion heated to about 83° C. was added to a hot (110° C.) solution of 5 grams of high density polyethylene in 400 ml. of toluene. This system was agitated by a mechanical stirrer. The polyethylene was prepared according to the method of Hogan et al., supra, and had a density of 0.960 and a melt index of 0.9. The polyethylene was precipitated from solution by the alcohol, substantially all the carbon black being carried down simultaneously. The polyethylene-carbon black masterbatch was removed on a filter and dried under vacuum.

This masterbatch, containing approximately 30 percent carbon black, was mixed with a further amount of high density polyethylene to provide a 3 percent black-containing mixture. In this mixing step the polyethylene was placed on a roll mill and the masterbatch incorporated by milling at about 149° C. for 20 minutes.

The 3 percent black-containing polymer prepared was evaluated as described above, the rating being B.

Example II

A series of tests was made to determine the criticality of the several steps in the process. In the first of these, the process steps of the run shown above were repeated with the exception of the heating of the isopropanol dispersion of carbon black, addition being made with the dispersion at room temperature. Evaluation of a 3 percent "let down" was D, showing that heating of the dispersion was an essential step in the process. This run was repeated, heating the dispersion to about 110° C., but omitting the homogenizing step. Evaluation of a 3 percent "let down" was D. This run demonstrated the necessity for the homogenizing step.

Another test was made in which toluene was substituted for the isopropanol. Homogenizing and heating of the dispersion were exactly as before. When the hot dispersion of carbon black and the hot polymer solution had been mixed, about 100 ml. of boiling isopropanol was added to precipitate the polymer. Rating of a 3 percent "let down" was inferior (C or poorer). This test was repeated in the same manner except no isopropanol was added. The polymer was precipitated by allowing the system to cool. The first portion of the polymer precipitated carried down all the black, later portions being essentially unpigmented. A test on a 3 percent "let down" gave a value of D. This run was repeated in all respects except that the polymer was recovered by boiling off the solvent. Again the black was concentrated in the first portion of the polymer to separate. Rating of the "let down" was D.

A summary of these tests is shown in the following tabulation. In all cases the masterbatch was made to provide a 30 percent carbon black content. The temperature of the toluene solution of the polymer was at about 100 to 110° C.

| Run | Method of Incorporation | | | Observation | Rating |
|---|---|---|---|---|---|
| | Mechanical Treatment | Dispersed In— | Temp., ° C. | | |
| 1 | Homogenized | Isopropanol | Boiling | Excellent dispersion | B |
| 2 | do | do | Ca 25 | Poor dispersion | D |
| 3 | None | do | Boiling | do | D |
| 4 | Homogenized | Toluene | Ca 100 | do | C–D |
| 5 | do | do | Ca 100 | Non-homogeneous ppt | D |
| 6 | do | do | Ca 100 | do | D |

In density determinations the specimens are prepared by compression molding the polymer at 171° C. until completely molten followed by cooling to 93° C. at a rate of about −12° C. per minute. Water is then circulated through the mold jacket to continue the cooling to 66° C. at a rate not exceeding −7° C. per minute. The polymer is then removed from the mold and cooled to room temperature.

Density was determined by placing a smooth, void-free, pea-sized specimen cut from a compression molded slab of the polymer in a 50 ml., glass-stoppered graduate. Carbon tetrachloride and methylcyclohexane were added to the graduate from burettes in proportion such that the specimen was suspended in the solution. During the addition of the liquids the graduate was shaken to secure thorough mixing. When the mixture just suspended the specimen, a portion of the liquid was transferred to a small test tube and placed on the platform of a Westphal balance and the glass bob lowered therein. With the temperature shown by the thermometer in the bob in the range 23–26° C., the balance was adjusted until the pointer was at zero. The value shown on the scale was taken as the specific gravity. With the balance standardized to read 1.000 with a sample of distilled water at 4° C. the specific gravity will be numerically equal to density in grams per cc.

As will be evident to those skilled in the art, many variations and modifications of this invention can be practiced in view of the foregoing disclosure. Such variations and modifications are clearly believed to come within the spirit and scope of the invention.

We claim:

1. A process for producing a substantially agglomerate-free fine dispersion of a pigment in a polyolefin which comprises the steps of mixing a finely divided pigment with a non-solvent for said polyolefin, said non-solvent having a boiling point from about 75° C. to about 200° C., mechanically working said mixture by grinding until a homogenous mixture is obtained, heating said mixture to a temperature ranging from about 75° C. to about 150° C., mixing said hot mixture with a solution of said polyolefin, the amount of polymer dissolved in said solution ranging up to about 5 weight percent and the temperature of said solution being above the solution temperature of the polyolefin, the addition of said mixture causing precipitation of said polyolefin to form said dispersion, and recovering said dispersion as a product of the process.

2. A process according to claim 1 wherein the temperature of said mixture and said polymer solution are approximately the same when mixed together.

3. A process for producing a substantially agglomerate-free fine dispersion of carbon black and polyethylene which comprises the steps of grinding said carbon black with a non-solvent for said polyethylene until a homogenous mixture containing from about 1 to about 10 weight percent carbon black is obtained, said non-solvent being selected from the group consisting of alcohols and ethers having a boiling point from about 75° C. to about 200° C., heating the mixture thus obtained to a temperature within the range of about 75 to about 150° C., commingling said mixture with a hot solution of said polyethylene dissolved in a hydrocarbon solvent, the amount of polymer dissolved in said solution ranging from 1.5 to 3 weight percent and the temperature of said solution being above about 100° C., the addition of said mixture to said solution causing precipitation of said polyethylene to form said dispersion, and recovering said dispersion as a product of the process.

4. A process according to claim 3 wherein said non-solvent is isopropyl alcohol.

5. A process according to claim 3 wherein said product dispersion is milled with additional amounts of said polyethylene at a temperature above the softening temperature of said polyethylene to provide a final product containing from 0.1 to 5 percent carbon black uniformly dispersed therein.

6. A method for preparing a polyolefin-carbon black masterbatch from a hot solution of said polyolefin dissolved in a hydrocarbon solvent, said solution being at a temperature above about 100° C., which comprises commingling with said solution a homogenized mixture of carbon black and a non-solvent for said polyolefin selected from the group consisting of alcohols and ethers having a boiling point above about 75° C., said mixture being at a temperature above about 75° C., to precipitate said polyolefin from solution and form said masterbatch, and recovering said masterbatch as a product of the process.

7. A process according to claim 6 wherein said masterbatch is "let down" by milling with additional said polyolefin at a temperature above the softening temperature of said polyolefin to provide a final polyolefin product containing from about 0.1 to about 5 weight percent carbon black uniformly dispersed therein.

References Cited by the Examiner

UNITED STATES PATENTS

| 2,282,037 | 5/1942 | Dahle | 260—34.2 |
| 2,379,237 | 6/1945 | Jenkins | 260—34.2 |
| 2,940,960 | 6/1960 | Tegge et al. | 260—41.5 |
| 2,941,970 | 6/1960 | Craig | 260—34.2 |
| 2,952,656 | 9/1960 | Zomlefer | 260—41 |
| 3,060,145 | 10/1962 | Moscrip | 260—41 |

FOREIGN PATENTS 617,052   1/1960   Great Britain.

MORRIS LIEBMAN, *Primary Examiner.*

DANIEL ARNOLD, *Examiner.*

B. S. LEON, K. B. CLARKE, J. S. WALDRON,
*Assistant Examiners.*